Figure 1:
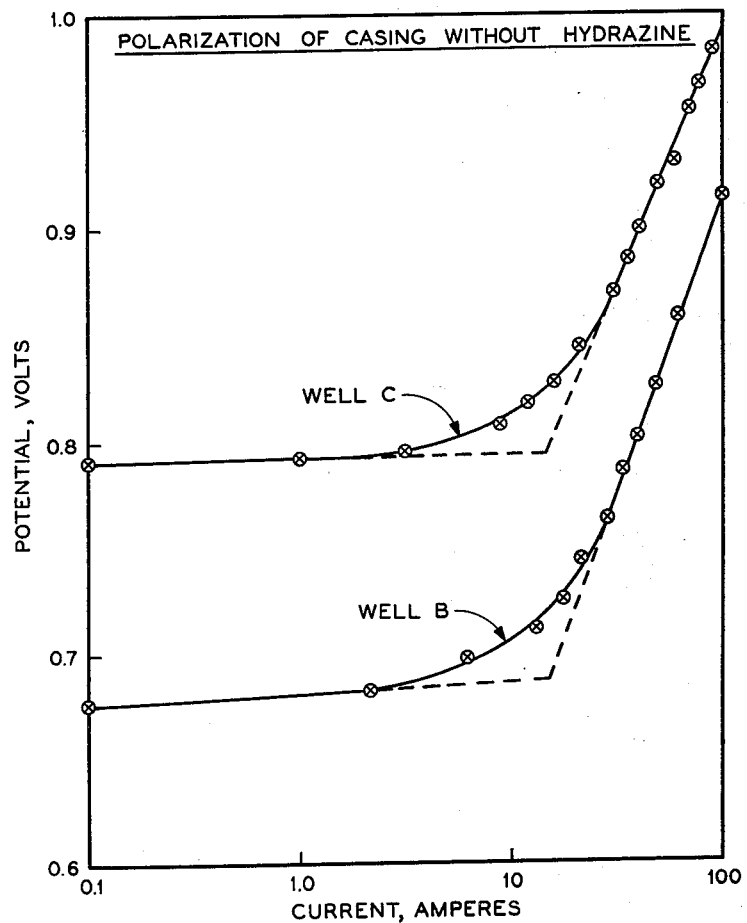

Feb. 2, 1960 T. S. ARCZYNSKI 2,923,355
PREVENTION OF CASING CORROSION
Filed July 1, 1957 3 Sheets-Sheet 1

INVENTOR
TADEUSZ S. ARCZYNSKI

2,923,355
PREVENTION OF CASING CORROSION

Tadeusz S. Arczynski, Brea, Calif., assignor, by mesne assignments, to California Research Corporation, San Francisco, Calif., a corporation of Delaware Application July 1, 1957, Serial No. 669,218

5 Claims. (Cl. 166—1)

This invention relates to a composition and method for inhibiting the corrosion of oil well casings and pertains more particularly to an improved method and composition for inhibiting the external corrosion of oil well casings.

In Rohrback and Chittum Patents 2,759,891, 2,764,242 and 2,764,465, various systems and compositions are proposed for inhibiting the external corrosion of oil well casings. The method of Patent 2,764,465 pertains to the steps of substantially completely eliminating oxygen from drilling mud and introducing said mud into the annular space between the exterior of a casing and the formation in order to minimize corrosion of the exterior of said casing occasioned by an oxygen availability differential between mud and a fluid in contact with the exterior of the casing. Patent 2,759,891 is concerned with an oil well mud cake wash solution comprising an aqueous solution of an alkali metal polyphosphate containing a small amount of stannous chloride. Patent 2,764,242 is concerned with a corrosion-inhibiting concentrate and a method of preventing external corrosion of oil well casing, wherein the annular space above the cemented zone and between the casing and the formation is filled with a special aqueous clay drilling mud containing small amounts of ferrous chloride or stannous chloride. In each of these patents, stannous chloride and ferrous chloride and like materials are disclosed for reducing the molecular oxygen content of the drilling mud left in substantially static condition in the annular space between the exterior of the casing and the formation.

Unfortunately, materials such as stannous chloride or ferrous chloride affect to a substantial degree the desirable properties of conventional drilling fluids. Thus, the addition of ferrous chloride increases substantially the viscosity of drilling mud, with the result that the mud pump pressure becomes excessive and it is difficult to displace the mud with the cement that follows it. Furthermore, the increase in viscosity increases the chance of sticking the drill pipe in the bore hole. Further, while stannous chloride and ferrous chloride can be used as addition agents to drilling mud, the addition thereof requires a re-balancing of the drilling fluid properties, particularly with respect to pH, viscosity, gel strength and other characteristics.

As has been indicated heretofore, it is the usual practice in completing oil wells to use an extremely good, high pH drilling fluid. In fact, it is often the practice to replace the drilling fluid that has been used throughout the drilling of the well with an especially good completion type drilling fluid. The purpose of this care is to insure that the drilling fluid has good plastering properties in order to avoid excessive contamination of the oil sands with drilling fluid filtrate and also excessive drilling fluid mudcake thickness on the bore hole walls. An excessive thickness to the mudcake on the bore hole walls makes it difficult to scour or to displace such mudcake with the cement that is used for cementing the casing in place and sealing off water bearing formations; such displacement by the cement is required in order to get a good bond between the formation and the cement. The especially good completion drilling fluid referred to above is ordinarily introduced into the bore hole after the casing has been placed in the bore hole; in such a procedure the completion drilling fluid is circulated down through the casing and up the outside of the casing through the annulus between the casing and the formation. Sometimes the completion drilling fluid is used to float the casing as it is lowered into the bore hole. However, as indicated, the completion fluid is introduced into the bore hole to remove contaminates and drill cuttings and to obtain a thin mudcake on the bore hole walls with a minimum of filtrate penetrating the oil sands. Often the completion drilling fluid is an oil base or an emulsion type drilling fluid which is used in the last portion of drilling and introduced into the well before penetrating the oil sands. Sometimes very high pH caustic drilling fluids are used, since they are quite resistant to salt water intrusion.

It has now been found that casing corrosion can be very markedly inhibited by an improved treatment of the drilling fluid or other fluid that fills the annular space above the cemented zone and between the casing and formation. The unexpected advantage of the present invention is based on the treatment of the completion drilling fluid with an agent which eliminates oxygen from said drilling fluid but without appreciably affecting the desirable properties of the drilling fluid. In other words, the present invention resides in the addition of an oxygen scavenging agent to the drilling fluid to produce a modified drilling fluid of the appropriate characteristics without requiring further drilling fluid treatment to re-balance the desirable characteristics thereof.

Figure 2:
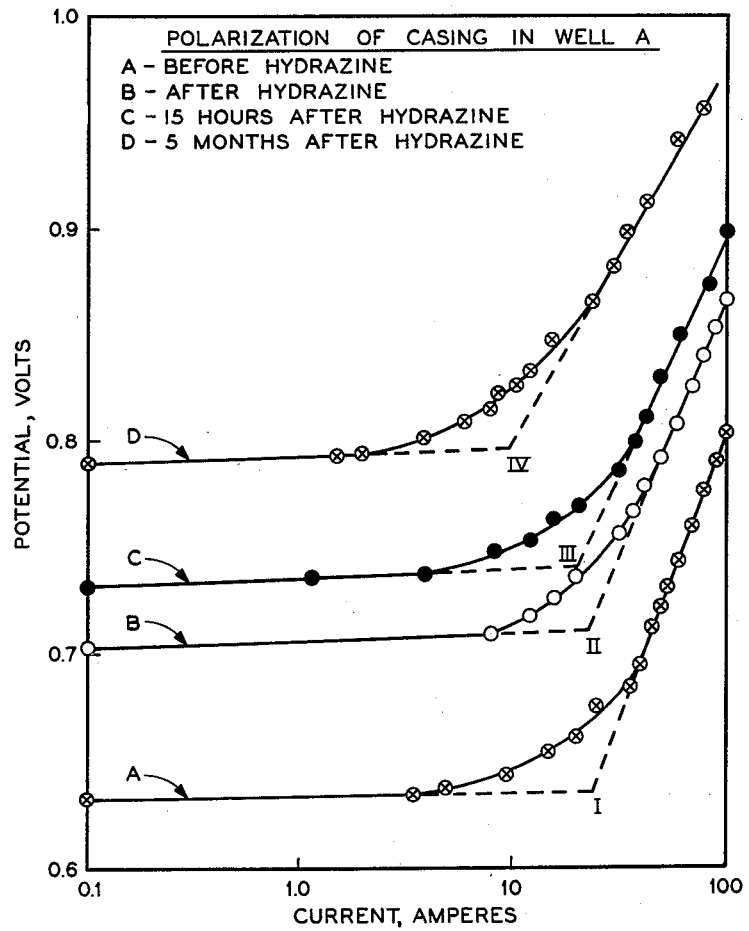
Figure 3:
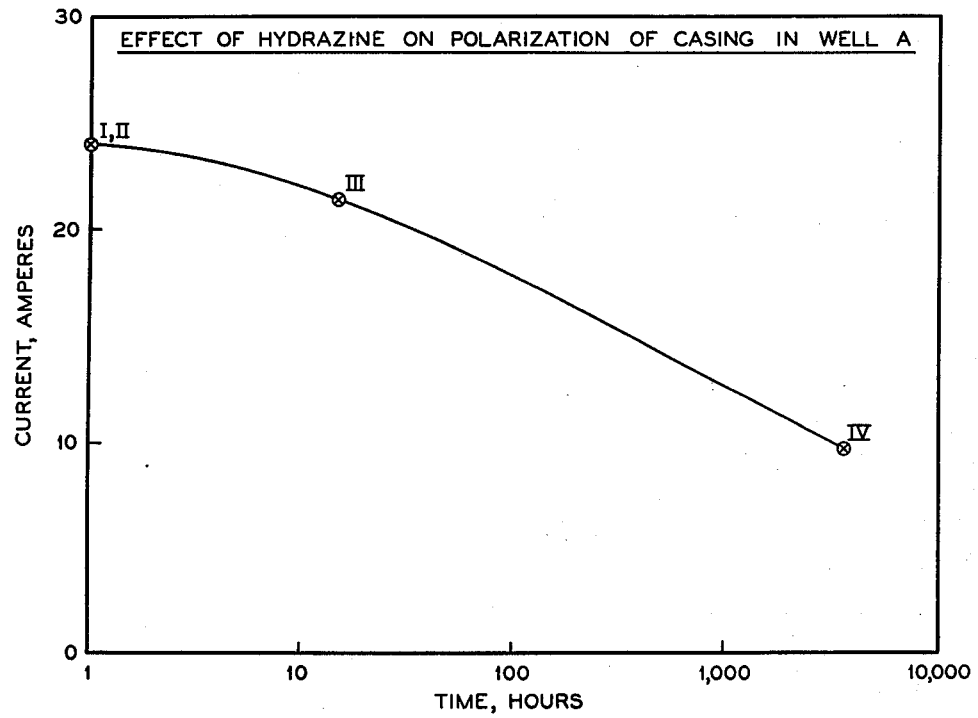

Figures 1, 2 and 3 show the results of comparative tests for casing corrosion in full scale wells, as described more fully hereinbelow.

We have found that the above-mentioned advantages can be obtained by the use of hydrazine or a compound or complex thereof, such as hydrazine sulfate, which is capable of releasing hydrazine in the drilling fluid. As illustrated hereinbelow, hydrazine and hydrazine-containing materials are superior to ferrous and stannous chlorides as additives to completion drilling fluids in that hydrazine does not increase the viscosity of the drilling fluid or adversely affect the other desirable properties of drilling fluids. As indicated, the invention is concerned primarily with completion drilling fluids of the aqueous type, including those in which the fluid component is an aqueous solution or aqueous oil.

The amount of hydrazine or its equivalent hydrazine-containing material to be added to the completion drilling fluid will depend upon the amount of molecular oxygen dissolved in said aqueous drilling fluid. The amount of added hydrazine should be at least sufficient to substantially remove the dissolved oxygen content of said fluid. Ordinarily, such drilling fluids may contain 10 to 15 p.p.m. of dissolved oxygen, and it is usually desirable to add 20 to 100 times the stoichiometric amount of hydrazine in order to be sure that the dissolved oxygen is sufficiently removed and to thereby substantially minimize external corrosion of the casing. Stated in percentages by weight of drilling mud, 0.02 to 0.15% of hydrazine are preferred; generally, 0.01 to 1.5% of hydrazine or equivalent can be used. For example, in a mud having a density of about 84 pounds per cu. ft. 0.1 to 0.5 pound of hydrazine (or 0.2 to 1.0 pound of hydrazine hydrate) is preferably used per barrel of drilling fluid. The hydrazine material is preferably injected continuously into the drilling fluid on the suction side of the mud pump as the completion drilling fluid is introduced into the casing. Addition of the hydrazine material to the mud pits is not usually desirable because of the reactivity of hydrazine with oxygen and also the possible toxic effects of hydrazine when added to an open system. As contrasted to the proposed diluted solutions of hydrazine in drilling fluids, hydrazine in its concentrated state should be handled carefully such as by stainless steel pumps and flow line.

To illustrate the present invention, the following tests were made with a field sample of an aqueous emulsion drilling fluid containing very substantial proportions of dissolved and adsorbed elemental oxygen. The field sample was an oil-in-water emulsion drilling fluid which had been used in drilling a well and which had a pH of 9 and was composed of 49% water, 11% crude oil and 40% solids. The 40% solids consisted of 33.1% barytes, 2.1% New Mexico lignite, 0.24% of a gel-forming Wyoming clay, 0.57% hydrated lime, 0.82% native clay, 0.04% soda ash, 0.65% caustic soda, 0.11% Quebracho extract, and 2.37% sodium petroleum sulfonate. (All percentages are by weight.)

To aid in comparing the test results, the stoichiometric relationships between hydrazine, oxygen and ferrous chloride are as follows:

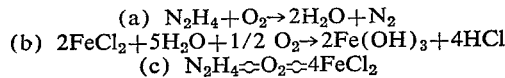

(a) $N_2H_4 + O_2 \rightarrow 2H_2O + N_2$
(b) $2FeCl_2 + 5H_2O + 1/2\ O_2 \rightarrow 2Fe(OH)_3 + 4HCl$
(c) $N_2H_4 \backsim O_2 \backsim 4FeCl_2$ Since ferrous chloride is usually available and employed as the tetrahydrate, a concentration of 0.2 p.p.b. (i.e., pounds per barrel) of hydrazine is equivalent in the present instance to 5 p.p.b. of ferrous chloride tetrahydrate.

EXAMPLE 1

The several important characteristics of the drilling fluid were measured before and after addition thereto of 0.2 p.p.b. of hydrazine. The plastic viscosity was measured by a Fann V-G Meter which is described by J. G. Savins and W. F. Roper in an article entitled "A Direct Indicating Viscometer for Drilling Fluids," at pages 7–22 of A.P.I. Drilling and Producing Practice for 1954. The methods and apparatus for determining the yield point, gel strength, filter loss and filter cake thickness are described in "Composition and Properties of Oil Well Drilling Fluids" by Rogers, Second Edition (Gulf Publishing Company). The results of such measurements are given in Table I.

Table I

| Properties | Before Treating | After Treating |
|---|---|---|
| Plastic viscosity (centipoises) | 65 | 72 |
| Yield point (lbs./100 sq. ft.) | 17 | 19 |
| 10 sec. gel strength (lbs./100 sq. ft.) | 4 | 4 |
| 10 min. gel strength (lbs./100 sq. ft.) | 25 | 24 |
| pH | 11.2 | 11.5 |
| 30 min. filter loss (ml.) | 1.6 | 1.7 |
| Filter cake thickness (inches) | 1/32 | 1/32 |

The foregoing data indicate that the treatment of the drilling fluid made no significant change in the important properties of the fluid.

EXAMPLE 2

For comparison with the use of hydrazine in Example 1 above, a drilling fluid substantially like that used in Example 1 was treated with 2.2 p.p.b. of ferrous chloride tetrahydrate. The addition of the ferrous chloride tetrahydrate caused the physical properties to be excessively high, and therefore the fluid was thinned by addition of Quebracho extract and added caustic in the manner well known for adjusting the physical properties of drilling fluids. Thereafter, the physical properties of the treated fluid were measured. The measurements on the fluids are given in the following table.

Table II

| Properties | Before Treating | After Treating |
|---|---|---|
| Plastic viscosity | 51 | 29 |
| Yield Point | 14 | 50 |
| 10 sec. gel strength | 3 | 17 |
| 10 min. gel strength |  | 37 |
| pH | 11.8 | 12.4 |

It will be apparent from Examples 1 and 2 that hydrazine is much superior to ferrous chloride in that the former has less effect on the desirable properties of the drilling fluid.

EXAMPLE 3

The effectiveness of the addition of hydrazine to reduce the corrosivity of the above drilling fluid was shown by measuring the change in electromotive potentials for sand blasted steel coupons and mill scale coated steel coupons which were suspended in the drilling fluid in sealed glass containers fitted with saturated calomel reference cells. The potentials, in millivolts, referred to the saturated calomel reference electrode, for each coupon were measured initially and periodically for 16 weeks. The final reading, given below, is the highest reading obtained subsequent to the initial reading of the potential. The results are given in Table III.

Table III

| Hydrazine Added (p.p.b.) | Potentials (mv.) | | | |
|---|---|---|---|---|
|  | Sand Blasted Coupon | | Mill Scale Coated Coupon | |
|  | Initial | Final | Initial | Final |
| 0 | −538 | −525 | −147 | −513 |
| 0.2 | −577 | −619 | −363 | −620 |
| 1.0 | −575 | −643 | −462 | −652 |

The above measurements indicate that the potentials of bare steel and mill scale coated steel are shifted in the anodic direction. Potential shifts in the anodic direction indicate consumption of dissolved oxygen and reduction in corrosion. Virtual disappearance of potential difference between bare steel and mill scale coated steel also indicates oxygen depletion because zero potential difference should exist if all oxygen is consumed.

A test was conducted in an oil well as follows:
Well A was drilled using a crude oil emulsion drilling mud of pH 9.0 of a composition substantially the same as used in Example 1, with the addition of a small amount of emulsified asphalt. Seven inch casing was floated into the hole and the potential break method [as described in J. M. Pearson, "Null Methods Applied to Corrosion Measurements," Trans. Electrochemical Society, 81, 485 (1942)] of determining cathodic current requirements was used to measure the initial current requirements. Similar measurements also were made in adjacent wells B and C. Both of these wells are of comparable depth and casing size and were completed 12 and 18 months, respectively, prior to completion of well A. Results of the tests on wells B and C are shown plotted as potential versus log-current curve in Figure 1. A similar curve for well A is shown in Figure 2.

After measurement of current requirements for the three wells, hydrazine was added upstream of the mud pump at well A and 500 barrels of hydrazine treated mud was circulated behind the casing. Fifty-three gallons of hydrazine hydrate (35% active) was added to the 500 barrels of mud before circulation behind the casing. Current requirements then were measured at well A immediately after, 15 hours after and 5 months after the well was completed. Results of the measurements are shown in Figure 2.

Figure 3 shows the effect of hydrazine on cathodic current requirements as a function of time, the Roman numerals corresponding to the break points in Figure 2. It can be seen that as time elapsed, current requirements decreased. This decrease is attributed to the depletion of oxygen in the mud by reaction with hydrazine. Evidence supporting the belief that hydrazine is responsible for the marked reduction in current requirement is given by the fact that after 12 and 18 months, two similar wells completed without hydrazine still require currents 50% greater than the hydrazine treated well.

We claim:

1. In an oil well drilling process wherein the annular space between the casing and the formation is filled with an aqueous drilling fluid and said drilling fluid is displaced by cement from adjacent a desired zone of the formation to be sealed off by allowing the cement to harden at such position, leaving drilling fluid in substantially static condition above the cemented zone in said annular space, the improvement of minimizing corrosion of the exterior of said casing in contact with said static body of drilling fluid without adversely affecting the desirable properties of the drilling fluid, which improvement comprises introducing into said drilling fluid, as it is introduced into the well, a hydrazine material capable of combining with molecular oxygen and in a small amount sufficient at least to eliminate substantially completely oxygen in said drilling fluid.

2. In an oil well drilling process wherein the annular space above a cemented zone between the casing and the formation is filled with a completion drilling fluid in substantially static condition and normally containing corrosive amounts of molecular oxygen, the improvement which comprises adding to said completion fluid a small amount of a hydrazine material capable of releasing hydrazine to react as a reducing agent with oxygen in said completion fluid, said amount of hydrazine material being sufficient at least to eliminate substantially completely molecular oxygen from said drilling fluid, whereby corrosion of the exterior of the casing in contact with said drilling fluid is substantially minimized and the viscosity and plastering properties of said drilling fluid are not appreciably affected adversely.

3. The method of preventing external corrosion of oil well casing which comprises filling the annular space above the cemented zone and between the casing and the formation with an aqueous drilling fluid containing 0.01 to 1.5 percent of a hydrazine material.

4. In an aqueous oil well completion drilling fluid suitable for placing above the cemented zone between the casing and the formation, the improvement which comprises the addition of a small amount of a hydrazine-contining material capable of combining with molecular oxygen, said amount being at least sufficient to eliminate substantially completely molecular oxygen in said drilling fluid, whereby the corrosivity of said completion drilling fluid to the exterior of the casing is substantially minimized without adversely affecting the desirable properties of said drilling fluid.

5. In an oil well drilling process wherein the completion drilling fluid which is circulated into the bore hole before introduction of the cement and which during the cementing of the casing is displaced at least in part by the cement into, and in substantially static condition fills, the annular space above the cemented zone between the casing and the formation, normally contains corrosive amounts of molecular oxygen, the improvement which comprises injecting into the drilling fluid as it enters the suction side of the mud pump for introduction into the well, 0.1 to 1.5% by weight based on said drilling fluid of hydrazine material selected from the group consisting of hydrazine and hydrazine hydrate, whereby corrosion of the exterior of the casing in contact with said completion drilling fluid is substantially minimized and the viscosity and gel strength of said drilling fluid is not appreciably affected adversely.

References Cited in the file of this patent

UNITED STATES PATENTS 2,764,465     Rohrback et al. _____ Sept. 25, 1956

OTHER REFERENCES

Hackh: Chemical Dictionary, Third Edition, 1944, page 417.